(12) United States Patent
Mettler et al.

(10) Patent No.: US 7,522,366 B2
(45) Date of Patent: Apr. 21, 2009

(54) PRESERVATION OF HARD DRIVE DATA VIA PRELIMINARY DETECTION OF ADJACENT TRACK INTERFERENCE POTENTIAL

(75) Inventors: Michael S. Mettler, Durham, NC (US); Daryl Cromer, Cary, NC (US); Matthew B. Griffith, Raleigh, NC (US); Jeffrey R. Hobbet, Holly Springs, NC (US); Scott D. Ruppert, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 100 days.

(21) Appl. No.: 11/565,503

(22) Filed: Nov. 30, 2006

(65) Prior Publication Data

US 2008/0130154 A1 Jun. 5, 2008

(51) Int. Cl.
*G11B 15/04* (2006.01)
(52) U.S. Cl. ........................................................ 360/60
(58) Field of Classification Search .................. 360/53, 360/31, 77.02, 60; 369/275.4
See application file for complete search history.

(56) References Cited

U.S. PATENT DOCUMENTS

| | | | | |
|---|---|---|---|---|
| 6,178,054 | B1* | 1/2001 | Wakefield | 360/31 |
| 6,181,493 | B1* | 1/2001 | Wakefield | 360/31 |
| 6,421,197 | B1* | 7/2002 | Abdelnour | 360/77.02 |
| 6,853,511 | B2* | 2/2005 | Seng et al. | 360/77.02 |
| 7,206,990 | B2* | 4/2007 | Su et al. | 1/1 |
| 2005/0243698 | A1* | 11/2005 | Yamanaka | 369/275.4 |

FOREIGN PATENT DOCUMENTS

| | | |
|---|---|---|
| JP | 05-257617 | 10/1993 |
| JP | 2001-118343 | 4/2001 |
| JP | 2005-322399 | 11/2005 |
| JP | 2006-286128 | 10/2006 |

* cited by examiner

*Primary Examiner*—Fred Tzeng
(74) *Attorney, Agent, or Firm*—Ference & Associates LLC

(57) ABSTRACT

Systems and methods for managing adjacent track interference in a hard drive. Adjacent track interference potential is ascertained in at least one track, and data corruption is averted via scrubbing data in at least one track with ascertained adjacent track interference potential.

26 Claims, 2 Drawing Sheets

PRESERVATION OF HARD DRIVE DATA VIA PRELIMINARY DETECTION OF ADJACENT TRACK INTERFERENCE POTENTIAL

FIELD OF THE INVENTION

The present invention relates to hard drives and problems encountered therewith, particularly adjacent track interference, and methods, arrangements and modules for addressing such problems.

BACKGROUND OF THE INVENTION

In the realm of hard drives, adjacent track interference (ATI) is a growing problem. When a particular track on the hard drive is written a large number of times (e.g., 30,000 times or more) without the adjacent track(s) being written, then the data on those adjacent track(s) can become corrupted. This constant overwrite causes some magnetic flux interference on the adjacent tracks that, over many cycles, can accumulate and leave the adjacent tracks unreadable.

For example, consider a track N as having adjacent tracks N+1 and N−1. If track N is written a large number of times before tracks N+1 or N−1 are also written, then the data on N+1 or N−1 could become corrupted. This is a well documented interaction encountered in magnetic recording.

A seemingly simple solution to this problem involves writing the data to the adjacent tracks before the data can become corrupted. However, complications arise in deciding when and how to rewrite the data on these tracks. There is no-simple counter of how many times the data at any particular sector is accessed; thus, it is essentially never clearly known as to when interference is about to take place. Currently, there are no known effective solutions to adjacent track interference in use at either the hard drive firmware level or the OS/application/driver level. Inasmuch as the first clear indication of ATI is that data has already become corrupted, it would simply be too late to merely save the data at that point, and the files involved would already be lost.

An aggregating factor with ATI is areal density As the areal density increases, the physical area containing the data decreases, thus increasing the percentage of area that represents a "fringe" or "border" area with respect to an adjacent track. Since, with ongoing technological developments, there will continue to be a significant increase in the number of tracks. areal density correspondingly increases. As such trends continue among the physical dimensions and physics of media and write mechanisms, the potential for increasing exposure to ATI will correspondingly increase.

As ATI problems have continued to proliferate, it has been found that common operating system programs have a tendency to cause a large number of writes to specific locations on hard drives. The data on the drives become corrupt when the excessive writes occur, and this often makes the systems unbootable. Indeed, this problem is growing due to increased areal density and OS workload while, at the same time, programs that access and update the information on the hard drive frequently can cause ATI.

SUMMARY OF THE INVENTION

Broadly contemplated herein, in accordance with at least one presently preferred embodiment of the present invention, are new methods and systems for improving existing drive scans and logs to detect future ATI problems and then scrubbing the data before the data becomes corrupt.

In summary, one aspect of the invention provides a method comprising: ascertaining an adjacent track interference potential in at least one track; and averting data corruption via scrubbing data in at least one track with ascertained adjacent track interference potential.

Another aspect of the invention provides a system comprising: a processor; and a memory storing code accessible by the processor to: ascertain an adjacent track interference potential in at least one track; and avert data corruption via scrubbing data in at least one track with ascertained adjacent track interference potential.

Furthermore, an additional aspect of the invention provides a program storage device readable by machine, tangibly embodying a program of instructions executable by the machine to perform acts, said acts comprising: ascertaining an adjacent track interference potential in at least one track; and averting data corruption via scrubbing data in at least one track with ascertained adjacent track interference potential.

A further aspect of the invention provides a system comprising: a graphics adapter; a processor; and a memory storing code accessible by the processor to: ascertain an adjacent track interference potential in at least one track; and avert data corruption via scrubbing data in at least one track with ascertained adjacent track interference potential.

DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
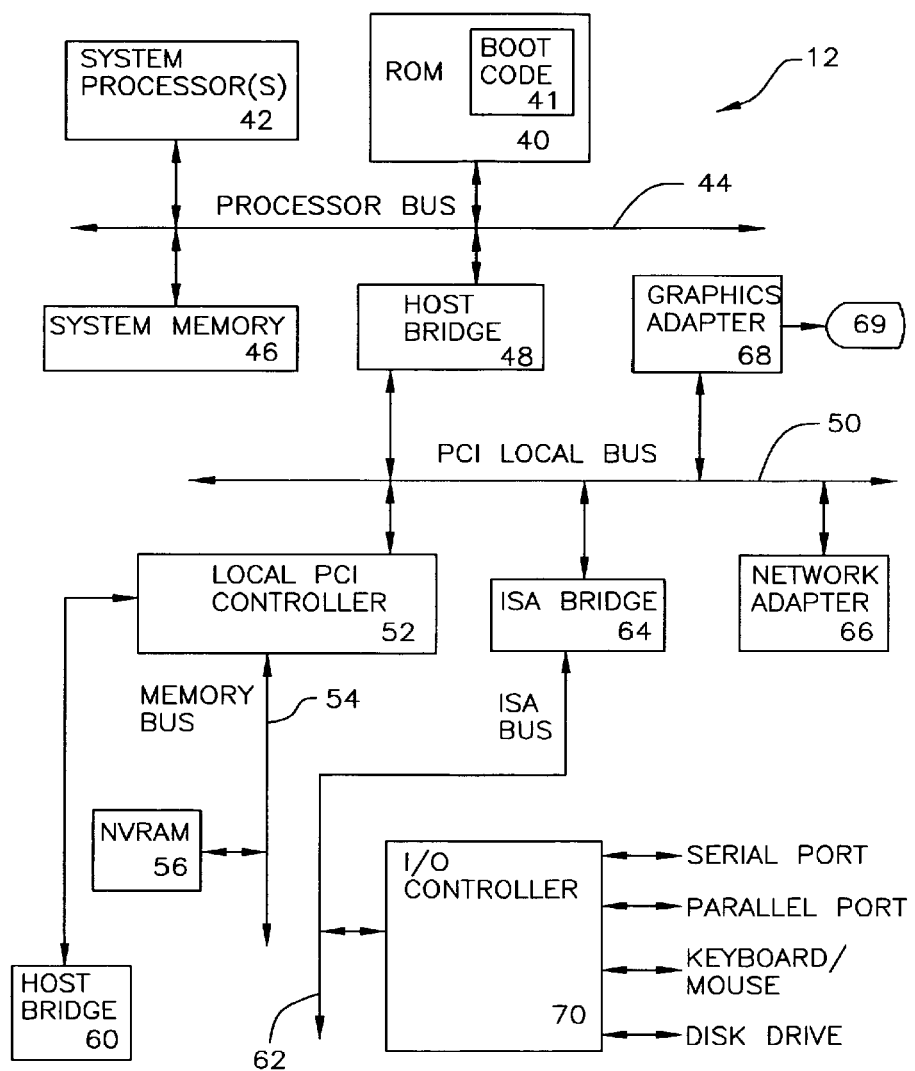
FIG. 1 is a block diagram of a computer system according to a preferred embodiment of the present invention.
Figure 2:
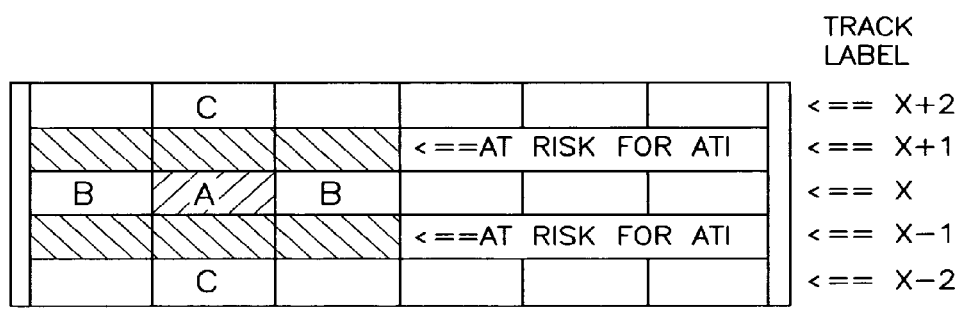
FIG. 2 is a schematic illustration of data tracks.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 2, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

There is broadly contemplated herein, in accordance with at least one presently preferred embodiment of the present invention, a method for improving existing drive scans and logs to detect future ATI problems and then scrubbing the data before the data becomes corrupt. This solution can be implemented in hard drive firmware and requires no new or dedicated application or driver. "Scrubbing", as generally understood herein, preferably involves reading data and then writing the same data over itself, to thereby remove any possible effects of ATI.

Current hard drive firmware and SMART data logging track bit errors during sector reads, and during idle time performs scans for corrupt data. If a sector is not readable, then it is marked as potentially bad, and on the next write it is determined to be either unusable or useable. But inasmuch as this action is used to flag bad/damaged sectors, it is only triggered once data cannot be read from a sector. Clearly, this does not address salient ATI issues since ATI has a cumulative effect that can result in a slow increase of bit errors before the sector is completely corrupted. Also, though the target sector may not be read from or written to for a long time, an adjacent sector in the meantime could well be written to enough times to induce damage by way of data corruption.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Purchase, N.Y. or a workstation computer, such as the Intellistation®, which are sold by International Business Machines (IBM) Corporation of Armonk, N.Y.; however, as will become apparent from the following description, the present invention is applicable to preservation of data on a disk drive by any data processing system.

As shown in FIG. 1, computer system 12 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to LAN 10, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and a disk drive. In addition, I/O controller 70 supports external communication by computer system 12 via serial and parallel ports.

FIG. 2 schematically illustrates five parallel tracks on a disk drive labeled consecutively from X−2 to X+2. In contrast with the above, in accordance with a preferred embodiment of the present invention, a new threshold is set for bit errors monitored during a sector read and/or background scans, and this threshold is used to look for ATI signatures (or "red flags"). Preferably, the threshold should take into account the cumulative effects of ATI and be low enough to detect ATI before the sector becomes unreadable. As such, an ATI signature is very specific when looking at the relationship of the bit error rates on one sector and comparing it with the bit error rates on sectors X+1, X+2, X−1, and X−2. If a sector being read during a background scan has a BER (bit error rate) above the threshold, then sectors up to 2 tracks away are preferably checked. If the signature is present where track X−1 has a good BER but track X−2 has an elevated BER, then ATI is suspected as being caused via writing the X−1 track. The same would be the case for the X+1 and X+2 tracks. This relationship of BERs on the surrounding tracks would thus constitute new ATI action criteria.

In FIG. 2, a sector A, two sectors B and two sectors C are labeled on various tracks. Here, by way of an illustrative and non-restrictive example, the threshold for elevated BER is detected on sector A on track X. It should thus be appreciated that if either sectors B or sectors C also exhibit an elevated BER, with the X+1 or X−1 tracks showing good BER, then ATI is considered as being a cause; these are shaded in FIG. 2 to accordingly indicate that they are at risk for ATI before significant damage has been done. In other words, with the X+1 or X−1 tracks showing good BER, prospective ATI can be detected early enough to avert undue damage, whereas conventional ATI detection methods would normally only be sufficient to prompt intervention after significant data corruption had occurred in one or more tracks.

If the algorithm determines that sectors or tracks are at risk for ATI, then the track X containing the target sector (in this case, sector A) as well as tracks X+2 or X−2 will preferably be scrubbed using a Read/Rewrite command. This read and rewrite will effectively undo the effects of ATI and prevent any data corruption.

A signature scan, as discussed and contemplated hereinabove, may be undertaken via essentially any suitable approach. Particularly good results have been observed via the use of a conventional background scan operation as described at the website of T13, a Technical Committee for the InterNational Committee on Information Technology Standards (INCITS) (www.t13.org); in particular, document 1699D AT Attachment-8 (ATA/ATAPI Command Set [ATA8-ACS]) specifies an AT attachment command set between host systems and storage devices. Section 7.52.5 of this document, "SMART Excecute Offline Immediate," describes offline data scanning that can be particularly employed in the context of the embodiments of the present invention (by way of employing a background reading to obtain signatures as discussed hereinabove).

The BER thresholds (particularly, elevated BER thresholds) as discussed and contemplated hereinabove can be chosen and customized appropriately for the application at hand; preferably they can be determined by the hard drive supplier on the basis of the known data recovery ability of the hard drive(s) in question. Thus, for those hard drives with particularly advanced and sophisticated data recovery capabilities, the BER threshold can likely be set higher, while for those hard drives with limited or compromised data recovery capabilities the BER threshold would likely need to be set lower.

Generally, it is to be appreciated that BER thresholds will be head and media design specific and can vary greatly among drives and in different contexts of HDD (hard drive data) generation, a BER threshold value should thus preferably be determined by each HDD design point. However, despite this apparent wide variability of BER thresholds, in accordance with at least one preferred embodiment of the present invention, a BER threshold value can advantageously be related to the overall error correction capability of the drive. In this posture, a BER threshold that leaves 50% ECC (error correcting code) power on a drive is recognized as being a useful and workable target or approximation in establishing a BER threshold value.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
    ascertaining an adjacent track interference potential in at least one track; and
    averting data corruption via scrubbing data in at least one track with ascertained adjacent track interference potential.

2. The method according to claim 1, wherein said ascertaining comprises applying a threshold to detect adjacent track interference signatures among tracks in a hard drive.

3. The method according to claim 2, wherein applying a threshold comprises applying a bit error rate threshold.

4. The method according to claim 1, wherein said ascertaining comprises selecting a target sector or track and comparing at least one performance criterion of the target sector or track with that of at least one adjacent sector or track.

5. The method according to claim 4, wherein said comparing performance criteria comprises comparing performance criteria up to two tracks away from a target sector or target tack.

6. The method according to claim 4, wherein said comparing performance criteria comprises comparing bit error rates of adjacent tracks.

7. The method according to claim 4, wherein said ascertaining further comprises determining significant adjacent track interference potential in the event of significantly differing performance criteria at adjacent sectors or tracks.

8. The method according to claim 1, wherein said scrubbing comprises reading data and thereafter rewriting data.

9. A system comprising:
    a processor; and
    a memory storing code accessible by the processor to:
        ascertain an adjacent track interference potential in at least one track; and
        avert data corruption via scrubbing data in at least one track with ascertained adjacent track interference potential.

10. The system according to claim 9, wherein the ascertainment acts to apply a threshold to detect adjacent track interference signatures among tracks in a hard drive.

11. The system according to claim 10, wherein the ascertainment acts to apply a bit error rate threshold.

12. The system according to claim 9, wherein the ascertainment acts to select a target sector or track and compare at least one performance criterion of the target sector or track with that of at least one adjacent sector or track.

13. The system according to claim 12, wherein the ascertainment acts to compare performance criteria up to two tacks away from a target sector or target track.

14. The system according to claim 12, wherein the ascertainment acts to compare bit error rates of adjacent tracks.

15. The system according to claim 12, wherein the ascertainment further acts to determine significant adjacent track interference potential in the event of significantly differing performance criteria at adjacent sectors or tracks.

16. The system according to claim 9, wherein said scrubbing acts to read data and thereafter rewrite data.

17. A program storage device comprising:
    program instructions embodied upon a computer-readable medium executable by a processing device to perform operations, said operations comprising:
    ascertaining an adjacent track interference potential in at least one track; and
    averting data corruption via scrubbing data in at least one track with ascertained adjacent track interference potential.

18. The program storage device according to claim 17, wherein said ascertaining comprises applying a threshold to detect adjacent track interference signatures among tracks in the hard drive.

19. The program storage device according to claim 18, wherein said applying a threshold comprises applying a bit error rate threshold.

20. The program storage device according to claim 17, wherein said ascertaining comprises selecting a target sector or track and comparing at least one performance criterion of the target sector or track with that of at least one adjacent sector or track.

21. A system comprising:
    a graphics adapter;
    a processor; and
    a memory storing code accessible by the processor to:
        ascertain an adjacent track interference potential in at least one tack; and
        avert data corruption via scrubbing data in at least one track with ascertained adjacent track interference potential.

22. The system according to claim 21, further comprising an input/output (I/O) controller which is capable of controlling communication between the system and an attached peripheral keyboard.

23. The system according to claim 21, wherein the ascertainment acts to apply a threshold to detect adjacent track interference signatures among tracks in a hard drive.

24. The system according to claim 21, wherein the ascertainment acts to select a target sector or track and compare at least one performance criterion of the target sector or track with that of at least one adjacent sector or track.

25. The system according to claim 24, wherein the ascertainment further acts to determine significant adjacent track interference potential in the event of significantly differing performance criteria at adjacent sectors or tracks.

26. The system according to claim 21, wherein said scrubbing acts to read data and thereafter rewrite data.

* * * * *